US011120796B2

(12) United States Patent
Leong

(10) Patent No.: US 11,120,796 B2
(45) Date of Patent: Sep. 14, 2021

(54) DISPLAY MODE DEPENDENT RESPONSE GENERATION WITH LATENCY CONSIDERATIONS

(71) Applicant: Google LLC, Mountain View, CA (US)

(72) Inventor: Jian Wei Leong, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 138 days.

(21) Appl. No.: 16/461,424

(22) PCT Filed: Oct. 3, 2017

(86) PCT No.: PCT/US2017/054931
§ 371 (c)(1),
(2) Date: May 16, 2019

(87) PCT Pub. No.: WO2019/070243
PCT Pub. Date: Apr. 11, 2019

(65) Prior Publication Data
US 2019/0348042 A1 Nov. 14, 2019

(51) Int. Cl.
G10L 15/22 (2006.01)
G06F 3/16 (2006.01)
G10L 15/18 (2013.01)

(52) U.S. Cl.
CPC .............. G10L 15/22 (2013.01); G06F 3/165 (2013.01); G06F 3/167 (2013.01); G10L 15/1822 (2013.01); G10L 2015/223 (2013.01)

(58) Field of Classification Search
CPC ..... G10L 15/22; G10L 15/08; G10L 15/1815; G10L 15/1822; G10L 15/193;
(Continued)

(56) References Cited

U.S. PATENT DOCUMENTS

2003/0093419 A1* 5/2003 Bangalore .......... G01C 21/3679
2009/0113475 A1* 4/2009 Li ...................... G06F 16/7335
725/39
(Continued)

FOREIGN PATENT DOCUMENTS

CN 106062869 10/2016
EP 2945157 11/2015
(Continued)

OTHER PUBLICATIONS

International Search Report and Written Opinion of PCT Ser. No. PCT/US2017/054931 dated Jun. 22, 2018.
(Continued)

Primary Examiner — Vijay B Chawan
(74) Attorney, Agent, or Firm — Middleton Reutlinger

(57) ABSTRACT

The present disclosure is generally related to a data processing system to process data packets in a voice activated computer network environment. The data processing system can improve the efficiency of the network by generating non-video data responses to voice commands received from a client device if a display associated with a client device is in an OFF state. A digital assistant application executed on the client device can send to the data processing system client device configuration data, which includes the state of the display device, among status data of other components of the client device. The data processing system can receive a current volume of speakers associated with the client device, and set a volume level for the client device based on the current volume level and a minimum response volume level at the client device.

20 Claims, 5 Drawing Sheets

(58) Field of Classification Search
CPC ......... G10L 15/24; G10L 15/26; G10L 15/30; G10L 2015/088; G10L 2015/223; G10L 2015/227; G10L 2015/228; G10L 25/00; G06F 3/167; G06F 3/165; G06F 16/2455; G06F 16/2465; G06F 2203/0381; G06F 2203/0384
USPC ............... 704/275, 270.1, 270; 707/909.003; 705/41; 715/728; 725/39; 726/1
See application file for complete search history.

(56) References Cited

U.S. PATENT DOCUMENTS

| | | | | |
|---|---|---|---|---|
| 2014/0019652 A1* | 1/2014 | Soffer | ...................... | G06F 21/84 710/73 |
| 2014/0365226 A1* | 12/2014 | Sinha | ................ | H04M 1/72519 704/275 |
| 2015/0200967 A1* | 7/2015 | Redlich | ................. | G06F 16/282 726/1 |
| 2015/0331665 A1* | 11/2015 | Ishii | ................... | H04N 21/4826 715/728 |
| 2019/0278795 A1* | 9/2019 | Leong | ...................... | G10L 15/22 |
| 2019/0384619 A1* | 12/2019 | Leong | ...................... | G06F 3/167 |
| 2020/0057606 A1* | 2/2020 | Jeong | ...................... | G06F 1/3265 |
| 2020/0057607 A1* | 2/2020 | Jeong | ...................... | G06F 3/167 |

FOREIGN PATENT DOCUMENTS

| | | | | |
|---|---|---|---|---|
| EP | 2945157 A2 * | 11/2015 | ............ | G10L 15/30 |
| JP | 2007036924 | 2/2007 | | |
| JP | 2009116539 | 5/2009 | | |
| JP | 2015184563 | 10/2015 | | |
| JP | 2015232868 | 12/2015 | | |
| WO | 2015133022 | 4/2017 | | |

OTHER PUBLICATIONS

Japanese Patent Office; Notice of Allowance issue in Application No. 2019-568361; 3 pages; dated Mar. 1, 2021.

Intellectual Property India; Examination Report issued in Application No. 201927051106; 6 pages; dated May 13, 2021.

The Korean Intellectual Property Office; Notice of Office Action issued in Application No. 10-2019-7037168; 6 pages; dated May 27, 2021.

* cited by examiner

DISPLAY MODE DEPENDENT RESPONSE GENERATION WITH LATENCY CONSIDERATIONS

BACKGROUND

Excessive network transmissions, packet-based or otherwise, of network traffic data between computing devices can prevent a computing device from properly processing the network traffic data, completing an operation related to the network traffic data, or responding timely to the network traffic data. The excessive network transmissions of network traffic data can also complicate data routing or degrade the quality of the response if the responding computing device is at or above its processing capacity, which may result in inefficient bandwidth utilization.

SUMMARY

According to an aspect of the disclosure, a system to process packetized audio signals in a voice activated computer network. The system includes a digital assistant application executed by a processor of a client device to transmit data packets via a client device network interface over a network, the data packets including a first input audio signal, detected by a sensor of the client device, and first client device configuration data. The system also includes a natural language processor component executed by a data processing system to receive, over the network, via a network interface of the data processing system, the data packets, the natural language processor component to parse the first input audio signal to identify a first request and a first trigger keyword corresponding to the first request. The system further includes a client device configuration appliance executed by the data processing system to determine from the first client device configuration data that a display associated with the client device is in an OFF state. The configuration appliance executed by the data processing system to generate, based in part on the first trigger keyword and the OFF state of the display, a first response data structure, the first response data structure including audio data and not including video data responsive to the first request, and transmit, over the network, via the network interface of the data processing system, the first response data structure to the digital assistant application at the client device.

According to an aspect of the disclosure, a method to process packetized audio signals in a voice activated computer network. The method includes transmitting data packets by a digital assistant application executed by a processor of a client device, via a client device network interface, over a network, the data packets including a first input audio signal, detected by a sensor of the client device, and a first client device configuration data. The method further includes receiving, at a natural language processor component executed by a data processing system, over the network, via a network interface of the data processing system, the data packets, the natural language processor component to parse the first input audio signal to identify a first request and a first trigger keyword corresponding to the first request. The method also includes determining, at a client device configuration appliance executed by the data processing system, from the first client device configuration data that a display associated with the client device is in an OFF state. The method further includes generating, at the client device configuration appliance, based in part on the first trigger keyword and the OFF state of the display, a first response data structure, the first response data structure including audio data and not including video data responsive to the first request. The method additionally includes transmitting, over the network, via the network interface of the data processing system, the first response data structure to the digital assistant application at the client device.

These and other aspects and implementations are discussed in detail below. The foregoing information and the following detailed description include illustrative examples of various aspects and implementations and provide an overview or framework for understanding the nature and character of the claimed aspects and implementations. The drawings provide illustration and a further understanding of the various aspects and implementations, and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component may be labelled in every drawing. In the drawings:

FIG. 2 illustrates a block diagram of an example client device.

DETAILED DESCRIPTION

Following below are more detailed descriptions of various concepts related to, and implementations of, methods, apparatuses, and systems for multi-modal transmission of packetized data in a voice activated data packet (or other protocol) based computer network environment. The various concepts introduced above and discussed in greater detail below may be implemented in any of numerous ways.

The present disclosure is generally directed to improving the efficiency and effectiveness of information transmission and processing over disparate computing resources. It is challenging for disparate computing resource to efficiently process responses to audio-based instructions in a voice-based computing environment. For example, the disparate computing resources may receive audio-based instructions for client devices that include both a display and a speaker. Generating and transmitting to the client device responses that include a visual component in addition to an audio component can consume computing resources, and can impact the response time to the instructions at the client device.

The present solution can reduce resource consumption, processor utilization, battery consumption, or bandwidth utilization, by generating responses to voice-based instructions based in part on configuration data received from the client device. In particular, the data processing system can reduce forego generating visual responses if the display of the client device is switched OFF.

Systems and methods of the present disclosure are generally directed to a data processing system that routes packetized actions via a computer network. The data processing system can process the voice-based instructions based in part on a configuration of the client device from which the voice-based instructions are received. For example, a digital assistant executing on a client device, such as a television (TV) can acquire voice-based instructions from a user and transmit the voice-based instructions in addition to configuration data associated with the TV, such as whether a display of the TV is in an ON or an OFF state. The data processing system can process the voice-based instruction and generate a response based in part on the state of the display. For example, if the state of the display is OFF, the data processing system may generate a response that includes an audio component but does not include a video component.

The present solution can reduce resource consumption, processor utilization, battery consumption, or bandwidth utilization, by generating responses to voice-based instructions based in part on configuration data received from the client device. In particular, the data processing system can reduce forego generating visual responses if the display of the client device is switched OFF.

Figure 1:
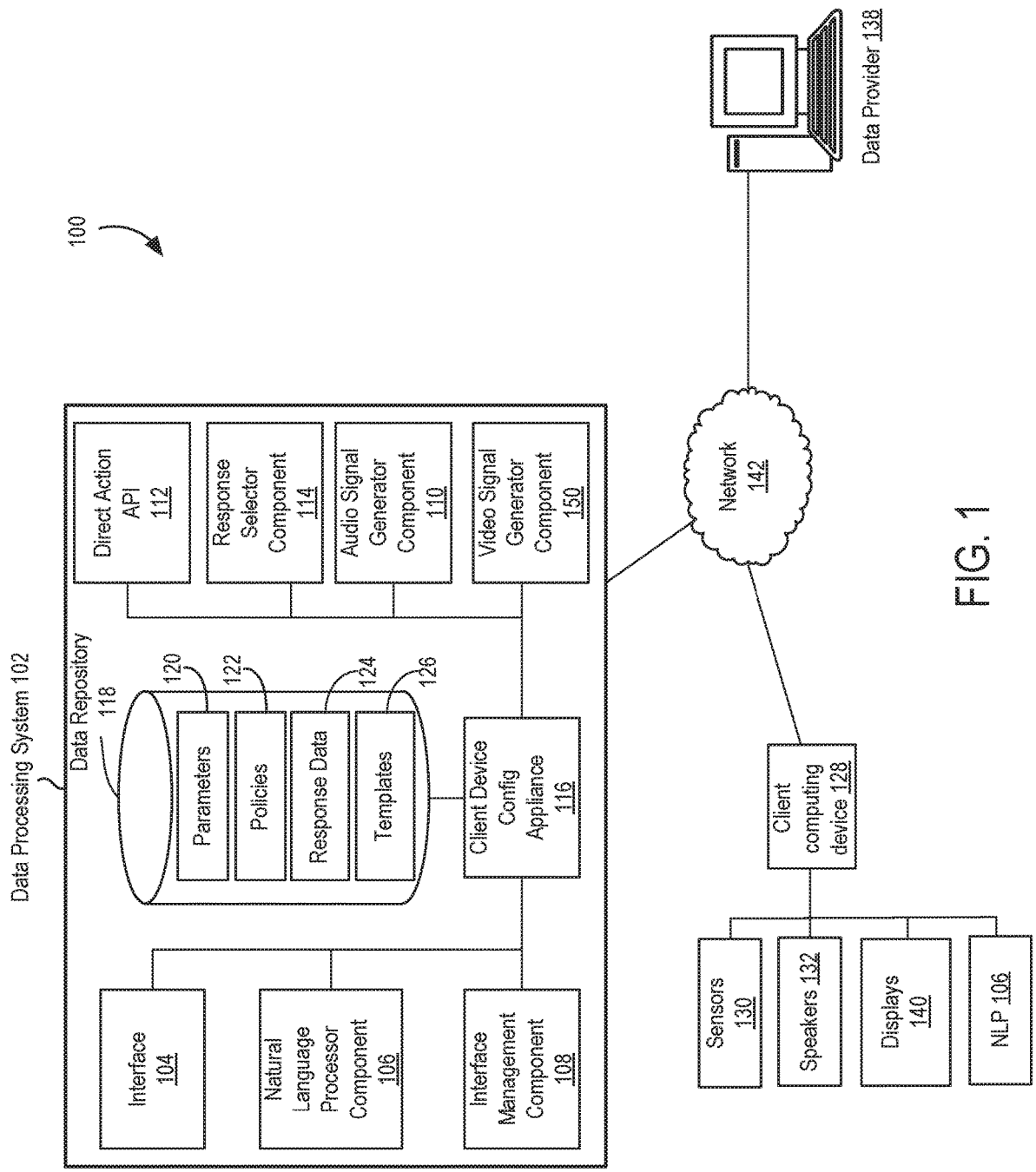
FIG. 1 illustrates an example system to process packetized audio signals in a voice activated computer network.

FIG. 1 illustrates an example system 100 to process packetized audio signals in a voice activated computer network. The system 100 can include at least one data processing system 102, one or more client computing devices 128 ("client device 128"). The data processing system 102 can include an interface 104. The data processing system 102 can include a natural language processor (NLP) component 106 to parse audio-based inputs. The data processing system 102 can include an interface management component 108 to detect and manage the interfaces of other devices in the system 100. The data processing system 102 can include an audio signal generator component 110 to generate audio-based signals. The data processing system 102 can include a video signal generator component 150 to generate video-based signals. The data processing system 102 can include a direction action application programming interface (API) 112. The data processing system 102 can include a response selector component 114 to select responses to audio-based input signals. The data processing system 102 can include a client device configuration appliance 116. The data processing system 102 can include a data repository 118 in which the data processing system 102 can store parameters 120, policies 122, response data 124, and templates 126. The client device 128 can include and execute instances of the components of the data processing system 102.

The client devices 128 can include sensors 130, speakers 132, and displays 140. The client device 128 can also execute an instance of the NLP component 106. The system 100 can also include one or more data provider computing devices 138. The components of the system 100 can communicate over a network 142. The network 142 can include computer networks such as the internet, local, wide, metro, or other area networks, intranets, satellite networks, other computer networks such as voice or data mobile phone communication networks, and combinations thereof. The network 142 can be used by the data processing system 102 and client devices 128 to access information resources such as web pages, web sites, domain names, uniform resource locators, or data providers 138. For example, the data processing system 102 can, via the network 142, access a data provider 138 that provides weather data for specific locations, such as a location associated with the client devices 128.

The network 142 can include, for example, a point-to-point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, a wireless network or a wireline network, and combinations thereof. The network 142 can include a wireless link, such as an infrared channel or satellite band. The topology of the network 142 may include a bus, star, or ring network topology. The network 142 can include mobile telephone networks using any protocol or protocols used to communicate among mobile devices, including advanced mobile phone protocol (AMPS), time division multiple access (TDMA), code-division multiple access (CDMA), global system for mobile communication (GSM), general packet radio services (GPRS), or universal mobile telecommunications system (UMTS). Different types of data may be transmitted via different protocols, or the same types of data may be transmitted via different protocols.

The client devices 128 can each include at least one logic device such as a computing device having a processor to communicate with each other with the data processing system 102 via the network 142. The client devices 128 can include an instance of the any of the components described in relation to the data processing system 102. The client devices 128 can include a television, a desktop computer, a laptop, a tablet computer, a personal digital assistant, a smartphone, a mobile device, a portable computer, a thin client computer, a virtual server, a speaker-based digital assistant, or other computing device. The client devices 128 can include a computing device that is capable of reproducing audio as well as visual data received from the data processing system 102 or the data provider 138.

The client device 128 can include at least one sensor 130, at least one speaker 132, and at least one display 140. The sensor 130 can include a microphone or audio input sensor. The sensor 130 can also include at least one of a GPS sensor, proximity sensor, ambient light sensor, temperature sensor, motion sensor, accelerometer, or gyroscope. The sensor 130 can include an occupancy or weight sensor. The speaker 132 can render audio signals by converting electrical signals into audible waves. The display 140 can include an light emitting diode (LED) display, an organic LED (OLED) display, a plasma display, a projector display, a holographic display, and the like. The display 140 can render images and videos received by the client device 128.

The client device 128 can be associated with an end user that enters voice queries as input audio signal into the client device 128 (via the sensor 130) and receives audio or video output in the form of a computer generated voice or images that can be provided from the data processing system 102. In response to the input audio signals, the client device 128 can also receive action data structures to perform predetermined functions or actions. The client device 128 can receive or provide data messages to the direct action API 112 of the data processing system 102 and enable communication between the components of the system 100. The client device 128 can also include a user interface that enables a user to interact with the components of the system 100.

The system's 100 data processing system 102 can include at least one server having at least one processor. For example, the data processing system 102 can include a plurality of servers located in at least one data center or server farm. The data processing system 102 can determine from an audio input signal a request and a trigger keyword associated with the request. Based on the request and trigger keyword, the data processing system 102 can generate or select response data. The response data can include audio-based, video based, or text-based data. For example, the response data can include one or more audio files that when rendered provide an audio output or acoustic wave. The data within the response data can also be referred to as content items.

The data processing system 102 can include multiple, logically grouped servers and facilitate distributed computing techniques. The logical group of servers may be referred to as a data center, server farm or a machine farm. The servers can be geographically dispersed. A data center or machine farm may be administered as a single entity, or the machine farm can include a plurality of machine farms. The servers within each machine farm can be heterogeneous—one or more of the servers or machines can operate according to one or more type of operating system platform. The data processing system 102 can include servers in a data center that are stored in one or more high-density rack systems, along with associated storage systems, located for example in an enterprise data center. The data processing system 102 with consolidated servers in this way can improve system manageability, data security, the physical security of the system, and system performance by locating servers and high performance storage systems on localized high performance networks. Centralization of all or some of the data processing system 102 components, including servers and storage systems, and coupling them with advanced system management tools allows more efficient use of server resources, which saves power and processing requirements and reduces bandwidth usage. Each of the components of the data processing system 102 can include at least one processing unit, server, virtual server, circuit, engine, agent, appliance, or other logic device such as programmable logic arrays configured to communicate with the data repository 118 and with other computing devices.

The data processing system 102 can include the data repository 118. The data repository 118 can include one or more local or distributed databases and can include a database management system. The data repository 118 can include computer data storage or memory and can store one or more parameters 120, one or more policies 122, response data 124, and templates 126, among other data. The parameters 120, policies 122, and templates 126 can include information such as rules about a voice based session between the client device 128 and the data processing system 102. The response data 124 can include content items for audio output, image/video output, or associated metadata, as well as input audio messages that can be part of one or more communication sessions with the client device 128.

An application, script, program, or other components that are associated with the data processing system 102 can be installed at the client device 128. The application can enable the client device 128 to communicate input audio signals (and other data) to the interface 104 of the data processing system 102. The application can enable the client device 128 to drive components of the client device 128 to render the output audio, image, or video signals.

The data processing system's NLP component 106 can receive input audio signals. The data processing system 102 can receive the input audio signal from the client device 128. The NLP component 106 can convert input audio signals into recognized text by comparing the input audio signal against a stored, representative set of audio waveforms and choosing the closest matches. The representative waveforms can be generated across a large set of input audio signals. Once the input audio signal is converted into recognized text, the NLP component 106 can match the text to words that are associated, for example, via a learning phase, with actions or output audio signals. From the input audio signal, the NLP component 106 can identify at least one request or at least one trigger or hot keyword corresponding to the request. The request can indicate intent or subject matter of the input audio signal. The trigger keyword can indicate a type of action likely to be taken.

The response selector component 114 can obtain information from the data repository 118, where it can be stored as part of the response data 124. The response selector component 114 can query the data repository 118 to select or otherwise identify response phrases or content item, e.g., from the response data 124.

The audio signal generator component 110 can generate or otherwise obtain an output signal that includes the content item. The data processing system 102 can execute the audio signal generator component 110 to generate or create an output signal corresponding to the content item or request. For example, once a request is fulfilled, the audio signal generator component 110 can generate an audio output signal that includes the phrase "The action was completed."

The video signal generator component 150 can generate or otherwise obtain an output signal that includes a content item. The data processing system 102 can execute the video signal generator component 150 to generate or create an output signal corresponding to the content item or request. For example, once a request is fulfilled, the video signal generator component 150 can generate an image or video output signal, which when displayed on the display 140 of the client device, can show the phrase "The action was completed."

The data processing system 102 can execute both the audio signal generator component 110 and the video signal generator component 150 to generate or create an output signal including an audio-visual output.

The interface 104 can be a data interface or a network interface that enable the components of the system 100 to communicate with one another. The interface 104 of the data processing system 102 can provide or transmit one or more data packets that include the response data structure, audio, image/video signals, or other data via the network 142 to the client device 128. For example, the data processing system 102 can provide the output signal from the data repository 118 or from the audio signal generator 110 to the client device 128. The data processing system 102 can also instruct, via data packet (or other protocol) based data transmissions, the client device 128 to perform the functions indicated in the response data structure. The output signal can be obtained, generated, transformed to or transmitted as one or more data packets (or other communications protocol) from the data processing system 102 (or other computing device) to the client device 128.

The direct action API 112 of the data processing system 102 can generate, based on, for example, the request, response data structures. The direct action API 112 can generate response data structures based also on a configuration of the client device 128. The response data structure can include data or instructions for the execution of a specified action to satisfy the request. The response data structure can include a JSON formatted data structure or an XML formatted data structure.

The client device configuration appliance 116 can determine a current configuration of the client device 128. The data packets received from the client device 128 can include configuration data of the client device 128. The configuration data can include statuses of one or more components of the client device 128. For example, the configuration data can include information about the ON or OFF state of the display 140 of the client device 128. The configuration data can also include the current volume setting ("mute" or "volume level") of the speakers of the client device 128. Depending on the action specified in the request, and the configuration data, the client device configuration appliance 116 can execute code or a dialog script that identifies the parameters required to fulfill the request. The client device configuration appliance 116 can generate response data structures responsive to the request and the configuration data. The response data structure can be included in messages that are transmitted to or received by the client device 128. The operation of the client device configuration appliance 116 in conjunction with that of the client device 128 is discussed further below after the discussion of an example client device.

Figure 2:
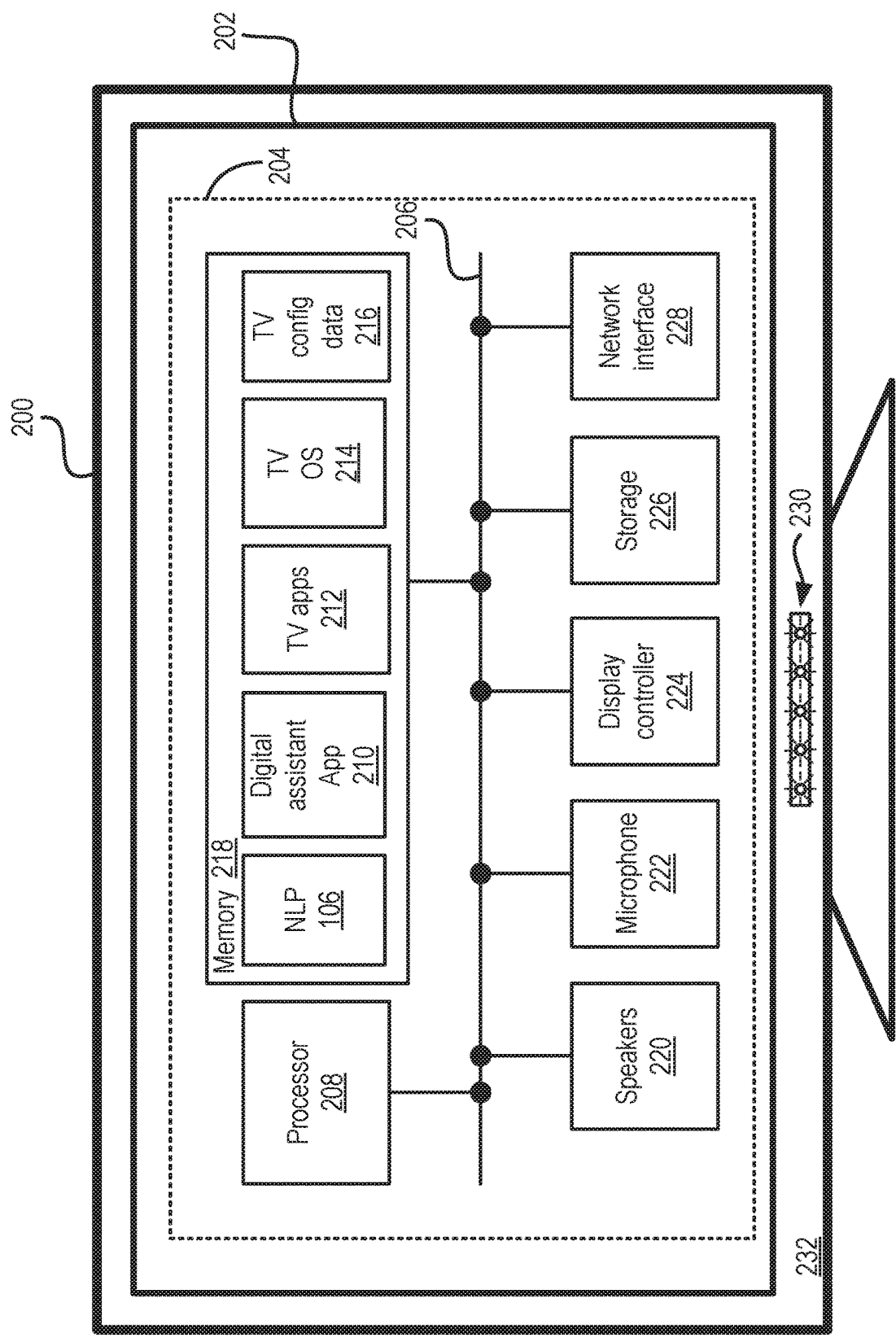
FIG. 2 illustrates

FIG. 2 illustrates a block diagram of an example client device 200. In particular, the client device 200 can include a TV or other display based devices, and can be used to implement the client device 128 shown in FIG. 1. The client device 200 includes a display screen 202 surrounded by a frame or bezel 232. The display screen 202 can include light emitting elements, such as light emitting diodes (LEDs), organic LEDs (OLEDs), plasma, and the like. The display screen 202 may also include a touch interface. The client device 200 can include a projector (such as, for example, a digital light projector (DLP)) instead of a display screen. The projector can project an image or video on a projection surface remote from the client device 200. The client device 200 can further include a control module 204 for controlling the operations of the client device 200. The control module 204 can include a processor 208, a memory 218, speakers 220, microphones 222, a display controller 224, storage 226, and a network interface 228. The components of the control module 204 can be connected to a data bus 206, which allows communication between the data modules. However, various components of the control module 204 can communicate directly with other components over communication channels other than the data bus 206. While not shown in FIG. 2, the client device can further include or be connectable to an radio frequency antenna or a radio frequency connector such as a coaxial cable. The control module 204 can further include a radio-frequency tuner and radio-frequency receiver circuitry for and tuning to, and receiving information on, radio frequency channels. For example, the client device can be a television that includes the radio-frequency tuner and the radio-frequency for receiving various channels of programing, which can be displayed on the display 202. The client device 200 also includes light emitting status indicators 230 disposed on the bezel 232. The light emitting status indicators 230 can include one or more light emitting elements, such as, LEDs, OLEDs, incandescent bulbs, or other light emitting elements. While the light emitting status indicators 230 are shown in FIG. 2 as being positioned on the bezel 232, the light emitting status indictors can also be positioned anywhere on the client device 200 as long as they are viewable by a user, such as for example, on a stand or along a side of the client device 200.

The processor 208 can include one or more microprocessors that can execute instructions associated with one or more programs, software modules, or applications stored in memory 218. The memory 218 can include several software modules such as a NLP 106, a digital assistant application 210, TV applications 212, a TV operating system 214, and TV configuration data 216. The NLP 106 can be similar to the NLP 106 discussed above in relation to the data processing system 102 shown in FIG. 1. The NLP 106 can process voice commands received by the digital assistant application 210 and determine requests and trigger keywords, which can be used by the digital assistant application 210 to process the voice command. The digital assistant application 210 can perform certain tasks or provide information to the user based on the voice commands. The digital assistant application 210 can communicate with the data processing system 102 (FIG. 1) for processing and responding to the voice commands. For example, the digital assistant can process an audio signal associated with a voice command into data packets, and send the data packets to the data processing system 102. The digital assistant application 210 also can receive audio or video signal responses from the data processing system 102, and reproduce the audio or video signals on the client device 200. The digital assistant application 210 can process and respond to the user commands without communicating with the data processing system 102, e.g., in a conversational manner. For example, if the voice commands include requests that can be fulfilled locally, the digital assistant application 210 can process the request locally at the client device 200 instead of sending the request to the data processing system 102. Examples of requests that can be fulfilled locally can include "turn off the lights," "switch OFF the TV," "mute the speakers," and the like.

TV applications 212 can include various applications that can be executed on the client device 200. The TV applications can include utility, entertainment, video, banking, settings, and other such applications. The TV operating system 214 can include smart TV operating systems such as webOS Smart TV, Android TV, etc. The TV operating system 214 can provide a user interface to receive user commands via a remote controller, switches/buttons on the client device, a touch interface on the display 202, or other devices such as mobile phones wirelessly communicating with the client device 200. The TV operating system also can provide processor, peripheral, and processing resources to launch and run the TV applications 212, the digital assistant application 120, and the TV applications 212. For example, the TV operating system 214 can allow the digital assistant application 210 access to the speakers 220, microphones 222, the digital controller 224, storage 226, and the network interface 228.

The memory 218 also can store TV configuration data 216, which can include information regarding the state of the client device 200. The TV configuration data 216 can include a data structure including identities of various aspects or components of the client device 200 and their corresponding state. For example, the TV configuration data 216 can include an identity of the display (such as, for example, "display") and the current state of the display (such as "ON" or "OFF"). The configuration data 216 may include identities and corresponding states of other components. For example, the configuration data 216 can include the currently set volume of the speakers 220 in addition to storing the current state, such as "ON" or "OFF" of the speakers. The configuration data 216 may also store a minimum volume level of the speaker 220 with which the digital assistant application 210 can communicate with the user. In some instances, the digital assistant application 210 can allow the user to set the preferred minimum volume level of the speakers 220 that the digital assistant application 210 can use to provide audible responses, reminders, or alarms to the user. The digital assistant application 210 can allow the user to grant the digital assistant application 210 permission to override a mute state of the speakers and set the speakers 220 volume to the minimum volume level when providing audible responses to the user. The digital assistant application 210 can send the configuration data 216 to the data processing system 102 separately from, or together with, voice command requests.

The speakers 220 can include one or more transducers that transform audio signals into corresponding audible sound. The speakers 220 can receive audio signals from an audio controller, which can include digital-to-analog converters, amplifiers, filers, and signal processing circuitry. The TV operating system 214 can provide applications running on the client device 200 application programmable interfaces (APIs) to interface with the audio controller. For example, applications such as the digital assistant application 210 can use the APIs to send audio signals to the audio controller, which, in turn, can send corresponding analog signals to the speakers 220 to generate sound. The digital assistant application 210 also can send control signals such as "mute" to mute the volume of the speakers 220, or send volume levels to set the volume of the speakers 220. The microphone 222 can include one or more transducers for converting sound energy into input audio signals. At least one microphone 222 can be located on the client device 200. At least one microphone 222 can also be located remotely from the client device, such as, for example, on a remote controller, a smart phone, or another device. The audio signals generated by the remotely located microphone can be transmitted to the client device 200 over a wireless link, such as through the network interface 228. The TV operating system 214 can also provide APIs and audio controllers to control the microphone 222. For example, the digital assistant application 210 can send configuration parameters to the microphone 222 and receive input audio signals from the microphone 222 via the APIs.

The display controller 224 can include hardware and software for controlling the display 202. In particular, the display controller 224 can receive video or image data and convert the video or image data into images on the display 202. The TV operating system 214 can provide APIs that can be used by application programs running on the client device 200 to send and receive data from the display controller 224. For example, the digital assistant application 210 can send video or image signals received from the data processing system 102 to the display controller 224 for rendering on the display 204. The digital assistant 210 also can send control signals or data to the digital controller 224 to control the operation of the display 202. For example, the digital assistant 210 can send display ON or display OFF commands to switch ON or switch OFF the display 202. In addition, the digital assistant 210 can request the status of the display 202, where the requested status can include the current state, for example, an ON state or an OFF state of the display 202. The display controller 224 can return the requested status to the digital assistant application 210, which can store the received status of the display in the TV configuration data 216. The display controller 224 may also control the operation of the light emitting status indicators 230. The client device 200 may include a separate controller for controlling the light emitting status indicators 230. The digital assistant application 210 can control the status and the operation of the light emitting status indicators 230 via the display controller 224 or any other appropriate controller. The digital assistant application 210 can receive from the data processing system 102 instructions to activate the light emitting status indicators 230 to display a particular pattern indicating a corresponding status. For example, one pattern can indicate that the data processing system 102 is processing a request. Another pattern can indicate that the request has been completed. The digital assistant application 210 can store a sequence of instructions and data corresponding to each of these patterns, and send the appropriate instructions and data to the display controller 224 or any other appropriate controller to actuate the light emitting status indicators 230 accordingly.

The storage 226 can include non-volatile memory such as hard-disk drives, solid-state drives, flash memory, and the like. The storage 226 can store application programs such as the operating system, and the various applications that can be run on the client device 200. The storage 226 also can store data such as entertainment data, music data, video data, and the like that can be accessed and manipulated by one or more applications running on the client device 200. The network interface 228 can include wired and wireless network interfaces which can provide network connectivity to the client device 200. For example, the network interface 228 can include WIFI, near field communication, wireless communication, and other wireless network interfaces, and can include Ethernet, DOCSIS, and other hardware network interfaces. The TV operating system 214 can provide APIs for applications running on the client system to utilize the network interface 228 to communicate data over a network. For example, the digital assistant 210 can use the APIs for the network interface 228 to communicate with the data processing system 102 over the network 142 (FIG. 1).

The client device 200 can be configured such that the display 202 can be switched OFF or ON independently of the control module 204 and the light emitting status indicators 230. That is, the display 202 can be switched OFF while maintaining the control module 204 operational. Thus, while the display 202 is switched OFF, the digital assistant application 210 can be running on the processor 208 of the client device 200. The digital assistant application can send and receive data packets from a data processing system, such as the data processing system 102 shown in FIG. 1, while the display is switched OFF. Further, the digital assistant application 210 can affect a change in the state of the display 202, for example from ON state to OFF state, or from OFF state to ON state.

Referring again to FIG. 1, the client device configuration appliance 116 can communicate with the digital assistant application 210 on the client device 200 to receive audio signals associated with voice commands and configuration data of the client device 200. As mentioned above, the digital assistant application 210 can send configuration data 216, such as, for example, the current state ("ON" or "OFF") of the display device, the current volume settings ("mute" "volume level") of the speakers 220. The configuration data may also include the minimum volume level at which the digital assistant application 210 reproduces sound at the client device 200. The NLP 106 can parse the audio signals to generate a request and a trigger keyword associated with the voice command. The client device configuration appliance 116 can generate an response data structure based on the trigger keyword and the configuration data.

Figure 3:
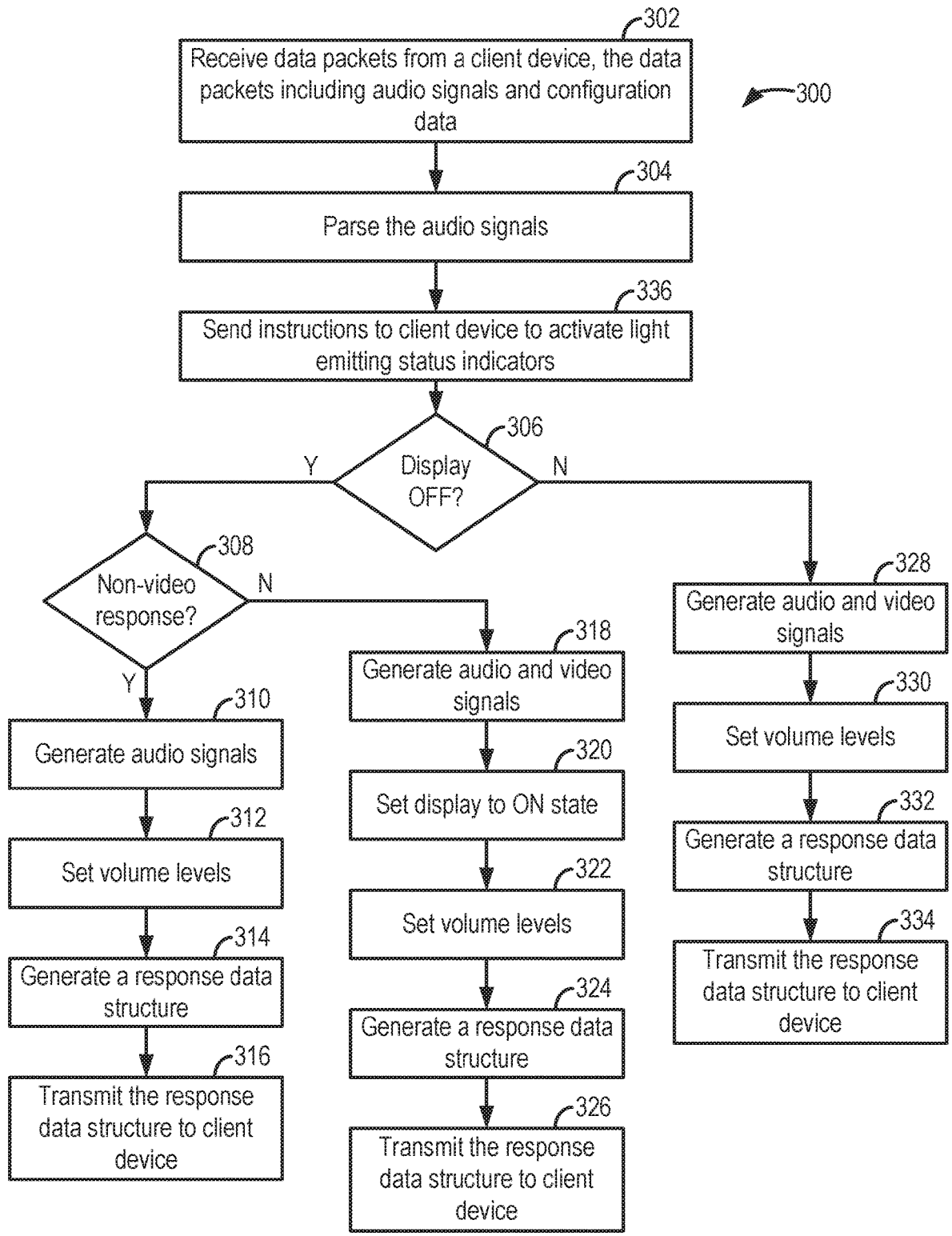
FIG. 3 illustrates a flow diagram of a method to process packetized audio signals in a voice activated computer network.

FIG. 3 illustrates a flow diagram of a method 300 to process packetized audio signals in a voice activated computer network. In particular, the method 300 can be executed by the data processing system 102 shown in FIG. 1. At least a portion of the method 300 can be executed by the client device configuration appliance 116 of the data processing system 102. The method 300 can include receiving data packets from a client device where the data packets include audio signals and configuration data (block 302). As discussed above in reference to FIGS. 1 and 2, a user at the client device 200 can speak voice commands, which are captured by the microphone 222 and converted into input audio signals. These audio signals are provided to the digital assistant application 210. The digital assistant application 210 also accesses the configuration data 216 to determine the current configuration of the client device, and in particular, the ON/OFF state of the display 202, the current volume setting ("mute" or the volume level), and a minimum response volume level indicating the minimum volume level at which the digital assistant application 210 can reproduce sound from the speakers 220. The digital assistant application 210 can send the audio signals corresponding to the voice command and the configuration data to the data processing system 102 via the network interface 228 and the network 142.

The method 300 can include parsing the audio signals (block 304). The NLP 106 can use language processing to parse the audio signals to determine a request and a trigger keyword. For example, if the audio signal corresponds to a voice command "what's the weather?" then the NLP 106 may determine that the phrase "the weather" corresponds to a request while the phrase "what" corresponds to the trigger keyword. The method 300 can include determining from the configuration data whether the display of the client device is in an OFF state (block 306). As mentioned above, the configuration data received from the client device 200 can include an identifier identifying a display, and the corresponding state of the display. The client device configuration appliance 116 can look-up the identity of the display and determine the current state. The state of the display can be either ON of OFF. First assuming that the client device configuration appliance 116 determines that the state of the display is OFF, the method 300 can include determining whether the response to the voice command received from the user can be generated using a non-video response (block 308). For example, the client device configuration appliance 116 can determine that the response to the user command "what's the weather?" can be generated without a video or image output. That is, the response can include an audio response providing the current weather at the location of the client device 200.

The method 300 can include generating the audio signals associated with the non-video response (block 310). The client device configuration appliance 116 can use the trigger keyword and the request to communicate with the data provider 138, which can be a weather data service provider, and request the weather data associated with the location of the client device 200. Upon receiving the weather data, the client device configuration appliance 116 can instruct the audio signal generation component 110 to generate audio signals corresponding to the weather data received from the data provider 138. For example, if the data received from the data provider is "72 degrees and sunny" the audio signal generator component 110 can utilize the weather data, and the current location information of the client device 200 and generate an audio signal for a response such as "Currently in New York it is 72 degrees and sunny."

The method 300 can include setting the volume levels of the speaker at the client device (block 312). As discussed above, the client device configuration appliance 116 can receive, in the configuration data, the current volume levels of the speakers 220 at the client device 200. The volume levels can either be "mute" or a particular volume level within a range of volume levels (say for example between 1 and 10). The configuration data can also include the minimum response volume level indicating the minimum volume level at which the digital assistant application 210 can reproduce sound from the speakers 220. The client device configuration appliance 116 can select higher of the current volume level and minimum response volume level to be the volume level at which the audio signal corresponding to the generated response is to be delivered to the user at the client device 200. The client device configuration appliance 116 can generate client configuration settings based on the selected volume level. For example, the client device configuration appliance 116 can include in the client configuration settings an identifier associated with the speaker volume and an associated volume level.

The method 300 can include generating an response data structure corresponding to the response to the voice command received from the client device 200 (block 314). The client device configuration appliance 116 can generate a data structure that can include the audio signal and configuration settings. The audio signal can correspond to the audio signal generated by the audio signal generation component 110, and the configuration settings can include the selected volume level (in block 312). The client device configuration appliance 116 can also include an identity of the voice command in response to which the audio signal has been generated. The method 300 can include transmitting the response data structure to the client device (block 316). The client device configuration appliance 116 can transmit the data structure including the audio signal and the configuration settings to the client device 200 via the interface 140. The interface 140 can convert the data structure into data packets and transmit the data packets to the client device 200 over the network 142. At the client device 200, the digital assistant application 210 receives the data packets via the network interface 228. The digital assistant application 210 regenerates the audio signal and the configuration settings from the data packets. The digital assistant application 210 can identify from the identity of the voice command, that the received audio signal is in response to an previously received voice command. The digital assistant application 210 can control the volume level of the speakers 220 to be set at the volume level included in the received configuration settings. The digital assistant 210 can output the audio signal from the speaker 220, thereby providing the user with an audio response to the voice command.

As mentioned above, in block 308 the client device configuration appliance 116 determines whether the response to the voice command received from the user can be generated using a non-video response. In some instances, the response to the voice command may need the client device configuration appliance 116 to generate a video based response. For example, if the voice command of the user is "Show me the weather for this week." The NLP 106 can determine that the phrase "weather for this week" corresponds to the request, while the phrase "Show me" corresponds to the trigger keyword. Based on the trigger keyword being "show" the client device configuration appliance 116 may determine that the user is requesting at least a visual response. Assuming that the client device configuration appliance 116 determines that a non-video response is not to be generated, the method 300 can include generating audio or video signals corresponding to the response (block 318). The client device configuration appliance 116 can determine obtain the weather data, as discussed above, from the data provider 138. The client device configuration appliance can then instruct the video signal generator component 150 to generate an image or a video signal corresponding to the weather data provided by the data provider 138. Optionally, the client device configuration appliance 116 may also instruct the audio signal generator component 110 to generate audio signals corresponding to the weather data.

The method 300 can include setting the configuration setting for the display to be ON (block 320). The client device configuration appliance 116 can generate configuration settings for the display 202 of the client device 200 to be switched ON, as the current state of the display is OFF and the response includes visual content. The method 300 can include setting the volume levels of the speaker at the client device (block 322). The client device configuration appliance 116 can set the volume levels of the speakers 220 of the client device 200 in a manner similar to that discussed above in relation to block 312. That is, the client device configuration appliance 116 selects the greater of the current volume level and the minimum response volume level as the volume level of the speaker 220 to generate the audio signal. In some instances, where the response does not include an audio signal and only includes the video signal, the client device configuration appliance 116 can skip executing block 322.

The method 300 can include generating a response data structure corresponding to the response to the voice command received from the client device (block 324). The client device configuration appliance 116 can generate the response data structure to include the video signal generated by the video signal generator component 150, and any audio signal generated by the audio signal generator component 110, in response to the voice command. The client device configuration appliance 116 can also include configuration settings, which can include instructions to switch the display 202 ON, and can include the volume level of the speakers 220. The method 300 can include transmitting the response data structure to the client device (block 326). The client device configuration appliance 116 can send the generated response data structure to the client device 200 in a manner similar to that discussed above in relation to the block 316. The digital assistant application 210 can receive the configuration data, and determine that the display 202 is to be switched ON. Responsive to this determination, the digital assistant application 210 can instruct the display controller 224 to switch ON the display 202. The digital assistant application 210 may also determine the volume levels from the configuration settings, and accordingly set the volume level of the speaker 220 to that indicated in the configuration settings. Thereafter, the digital assistant application 210 can send the video or image signal to the display controller 224 for rendering on the display 202 can send any audio signals to the speaker 220 for sound reproduction.

As discussed above in relation to the block 306, the client device configuration appliance 116 determines whether the display 202 of the display device 200 is in the OFF state. Assuming that the client device configuration appliance 116 determines that the display device 202 is not in the OFF state, and is instead in the ON state, the method 300 can include generating audio and video signals corresponding to the voice command (block 328). As the display 202 of the client device 200 is already in the ON state, the client device configuration appliance 116 can responds to the voice command with a visual response. Thus, the client device configuration appliance 116 can instruct the video signal generation command to generate a video signal corresponding to a visual response to the voice command. The client device configuration appliance 116 may also instruct the audio signal generation component 110 to generate an audio signal corresponding to a response to the voice command. The client device configuration appliance 116 may forego generating the audio signal, and may only generate the video signal including the visual response to the voice command. The method 300 can include setting the volume level of the speakers (block 330), generating a response data structure (block 332) and transmitting the response data structure to the client device (block 334). The client device configuration appliance 116 can execute this portion of the method 300 (including blocks 330, 332, and 334) in a manner similar to that discussed above in relation to blocks 312, 322, 314, 324, 316, and 326.

The client device configuration appliance 116 can instruct the client device to activate light emitting status indicators (block 336). In particular, the client device configuration appliance 116 may send these instructions to the client device 200 as soon as it receives or parses the data packets including the voice commands. The client device configuration appliance 116 can send configuration settings to the client device 200 including an identity of the light emitting status indicators 230 and the corresponding "ON" setting. The digital assistant application 210 can parse the configuration settings and determine that the light emitting status indicators 230 are to be switched ON. Responsive to this determination, the digital assistant application 210 can instruct the display controller 224, or any other appropriate controller controlling the light emitting status indicators 230, to switch ON the light emitting status indicators 230. The switching ON of the light emitting status indicators 230 can indicate to the user that the data processing system 102 is processing the voice command provided by the user. The client device configuration appliance 116 may send client configuration settings including instructions to switch ON the light emitting status indicators 230 only if the configuration data received from the client device 200 indicates that the display 202 is in the OFF state. The client device configuration appliance 116 may refrain from sending instructions to switch ON the light emitting status indicators 230 if the configuration data indicates that the display is ON. In some such instances, the client device configuration appliance 116 can instead send a status video data or status image data to the client device 200 for display on the ON display 202 while the data processing system processes the voice command. The status video data or status image data indicating the status of the processing of the voice command can be overlaid on whatever video or image is currently being displayed on the display 202. The video signal generation component 150 can generate the status video or status image signal. The video signal generation component 150 can generate the status video or status image data or signal that is configured to be positioned on a corner of the display 202 and occupies only a small portion (say less than 10%) of the entire area of the display 202.

As discussed above, the client device configuration appliance 116 determines the response to the voice command received from a user at the client device 200 based in part on the state of the display 202. In instances where responses are generated regardless of the state of the display 202, such responses may include both video signals and audio signals. By generating non-video responses when the display is determined to be in the OFF state, processing resources, which would have otherwise been allocated to generating a video based response, can be saved. Moreover, processing time for generation of video signals can be considerable greater than the processing time for generation of audio signals. By determining the OFF state of the display, and refraining from generating video signals, the overall processing time for generating a response to the voice command can be advantageously reduced. Thus, the user can receive relatively quicker responses to voice commands. In addition, because no video signals are transmitted to the client device over the network when the display 202 is determined to be in the OFF state, bandwidth resources of the network 142 can be more efficiently utilized.

The natural language processing of the voice commands received from the user can be carried out at the client device, instead of at the data processing system 102. For example, referring to FIG. 2, the digital assistant application 210 can instruct the NLP 106 running on the client device 200 to process the voice commands received from the user. The digital assistant application 210 may then send the identified request and the trigger keywords to the data processing system 102. By processing the voice commands at the client device, audio signals, transmission of which can consume relatively larger bandwidth compared to the transmission of the request and trigger keyword phrases, are not sent over the network, thereby reducing congestion in the network 142.

Figure 4:
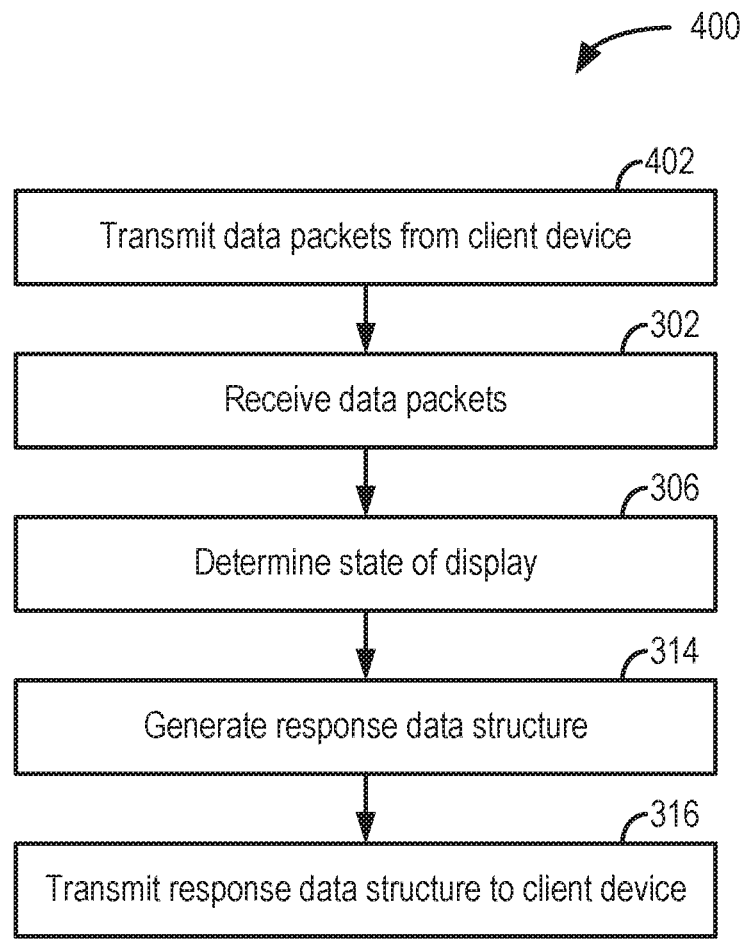
FIG. 4 illustrates a flow diagram of a method to process packetized audio signals in a voice activated computer network.

FIG. 4 shows a flow diagram of a method 400 to process packetized audio signals in a voice activated computer network. The method 400 can include transmitting data packets (block 402). For example, the client device 200 can transmit data packets to the data processing system 102. The data packets can include an input audio signal and client device configuration data. The audio signal can be detected by a sensor or a microphone 222 at the client device 200. A digital assistant application 210 executed by a processor 208 on the client device 200 can transmit the data packets via a client device network interface 228, over a network 142.

The method 400 can include receiving data packets (block 302). For example, a natural language processor component 106 can receive the data packets including the input audio signal and client device configuration data. The natural language processor component 106 can be executed by a data processing system 102, and can receive the data packets via a network interface 104 of the data processing system 102 over the network 142. The natural language processor component 106 can parse the audio signal to identify a request and a trigger keyword corresponding to the request.

The method 400 can include determining state of display (block 306). For example, a client device configuration appliance 116 executed by the data processing system 102 can determine the state of the display 202 from the client device configuration data. The state of the display can be an ON state or an OFF state. The method 400 can include generating a response data structure (block 314). For example, the client device configuration appliance 116 can generate, based in part on the trigger keyword and the OFF state of the display 202, a response data structure including audio data and not including video data responsive to the request. As another example, the client device configuration appliance 116 can generate, based in part on the trigger keyword and the OFF state of the display 202, a response data structure including audio data, video data, and client device configuration settings including instructions to switch ON the display 202 of the client device 200.

The method 400 can include transmitting response data structure to client device (block 316). For example, the client device configuration appliance 116 can transmit over the network 142 via a network interface 104 of the data processing system 102 the response data structure to the digital assistant application 210 executed on the client device 200. The response data structure can include audio data and does not include video data. As another example, the response data structure can include audio data, video data, and configuration settings data that instruct the client device 200 to change the state of one or more components of the client device 200.

Figure 5:
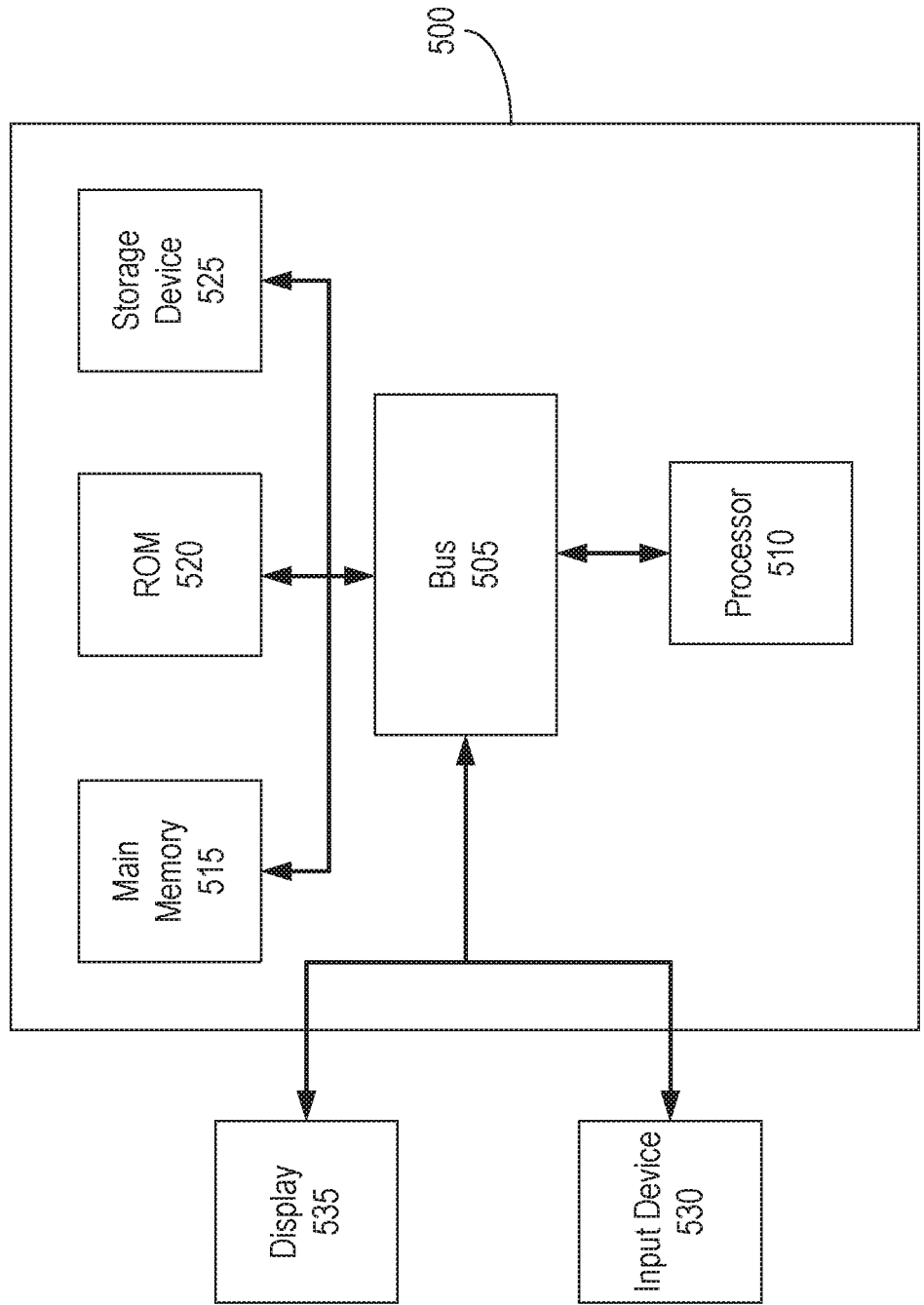
FIG. 5 is a block diagram of an example computer system.

FIG. 5 is a block diagram of an example computer system 500. The computer system or computing device 500 can include or be used to implement the system 100 or its components such as the data processing system 102. The computing system 500 includes a bus 505 or other communication component for communicating information and a processor 510 or processing circuit coupled to the bus 505 for processing information. The computing system 500 can also include one or more processors 510 or processing circuits coupled to the bus for processing information. The computing system 500 also includes main memory 515, such as a random access memory (RAM) or other dynamic storage device, coupled to the bus 505 for storing information, and instructions to be executed by the processor 510. The main memory 515 can be or include the data repository 118. The main memory 515 can also be used for storing position information, temporary variables, or other intermediate information during execution of instructions by the processor 510. The computing system 500 may further include a read-only memory (ROM) 520 or other static storage device coupled to the bus 505 for storing static information and instructions for the processor 510. A storage device 525, such as a solid state device, magnetic disk or optical disk, can be coupled to the bus 505 to persistently store information and instructions. The storage device 525 can include or be part of the data repository 118.

The computing system 500 may be coupled via the bus 505 to a display 535, such as a liquid crystal display or active matrix display, for displaying information to a user. An input device 530, such as a keyboard including alphanumeric and other keys, may be coupled to the bus 505 for communicating information and command selections to the processor 510. The input device 530 can include a touch screen display 535. The input device 530 can also include a cursor control, such as a mouse, a trackball, or cursor direction keys, for communicating direction information and command selections to the processor 510 and for controlling cursor movement on the display 535. The display 535 can be part of the data processing system 102, the client computing device 128 or other component of FIG. 1, for example.

The processes, systems and methods described herein can be implemented by the computing system 500 in response to the processor 510 executing an arrangement of instructions contained in main memory 515. Such instructions can be read into main memory 515 from another computer-readable medium, such as the storage device 525. Execution of the arrangement of instructions contained in main memory 515 causes the computing system 500 to perform the illustrative processes described herein. One or more processors in a multi-processing arrangement may also be employed to execute the instructions contained in main memory 515. Hard-wired circuitry can be used in place of or in combination with software instructions together with the systems and methods described herein. Systems and methods described herein are not limited to any specific combination of hardware circuitry and software.

Although an example computing system has been described in FIG. 5, the subject matter including the operations described in this specification can be implemented in other types of digital electronic circuitry, or in computer software, firmware, or hardware, including the structures disclosed in this specification and their structural equivalents, or in combinations of one or more of them.

For situations in which the systems discussed herein collect personal information about users, or may make use of personal information, the users may be provided with an opportunity to control whether programs or features that may collect personal information (e.g., information about a user's social network, social actions, or activities; a user's preferences; or a user's location), or to control whether or how to receive content from a content server or other data processing system that may be more relevant to the user. In addition, certain data may be anonymized in one or more ways before it is stored or used, so that personally identifiable information is removed when generating parameters. For example, a user's identity may be anonymized so that no personally identifiable information can be determined for the user, or a user's geographic location may be generalized where location information is obtained (such as to a city, postal code, or state level), so that a particular location of a user cannot be determined. Thus, the user may have control over how information is collected about him or her and used by the content server.

The subject matter and the operations described in this specification can be implemented in digital electronic circuitry or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatuses. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial-access memory array or device, or a combination of one or more of them. While a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices). The operations described in this specification can be implemented as operations performed by a data processing apparatus on data stored on one or more computer-readable storage devices or received from other sources.

The terms "data processing system," "computing device," "component," or "data processing apparatus" encompass various apparatuses, devices, and machines for processing data, including by way of example a programmable processor, a computer, a system on a chip, or multiple ones, or combinations of the foregoing. The apparatus can include special-purpose logic circuitry, e.g., an FPGA (field-programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures. The components of system 100 can include or share one or more data processing apparatuses, systems, computing devices, or processors.

A computer program (also known as a program, software, software application, app, script, or code) can be written in any form of programming language, including compiled or interpreted languages, declarative or procedural languages, and can be deployed in any form, including as a stand-alone program or as a module, component, subroutine, object, or other unit suitable for use in a computing environment. A computer program can correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs (e.g., components of the data processing system 102) to perform actions by operating on input data and generating output. The processes and logic flows can also be performed by, and apparatuses can also be implemented as, special purpose logic circuitry, e.g., an FPGA (field-programmable gate array) or an ASIC (application-specific integrated circuit). Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

The subject matter described herein can be implemented in a computing system that includes a back end component, e.g., as a data server, or that includes a middleware component, e.g., an application server, or that includes a front end component, e.g., a client computer having a graphical user interface or a web browser through which a user can interact with an implementation of the subject matter described in this specification, or a combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system such as system 100 or system 500 can include clients and servers. A client and server are generally remote from each other and typically interact through a communication network (e.g., the network 142). The relationship of client and server arises by virtue of computer programs running on the respective computers and having a client-server relationship to each other. In some implementations, a server transmits data (e.g., data packets representing a content item) to a client device (e.g., for purposes of displaying data to and receiving user input from a user interacting with the client device). Data generated at the client device (e.g., a result of the user interaction) can be received from the client device at the server (e.g., received by the data processing system 102 from the client computing device).

While operations are depicted in the drawings in a particular order, such operations are not required to be performed in the particular order shown or in sequential order, and all illustrated operations are not required to be performed. Actions described herein can be performed in a different order.

The separation of various system components does not require separation in all implementations, and the described program components can be included in a single hardware or software product. For example, the NLP component 106 and the client device configuration appliance 116 can be a single component, app, or program, or a logic device having one or more processing circuits, or part of one or more servers of the data processing system 102.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements, and features discussed in connection with one implementation are not intended to be excluded from a similar role in other implementations or implementations.

The phraseology and terminology used herein is for the purpose of description and should not be regarded as limiting. The use of "including," "comprising," "having," "containing," "involving," "characterized by," "characterized in that," and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or embodiment, and references to "an implementation," "some implementations," "one implementation," or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. References to "at least one of 'A' and 'B'" can include only 'A', only 'B', as well as both 'A' and 'B'. Such references used in conjunction with "comprising" or other open terminology can include additional items.

Where technical features in the drawings, detailed description, or any claim are followed by reference signs, the reference signs have been included to increase the intelligibility of the drawings, detailed description, and claims. Accordingly, neither the reference signs nor their absence have any limiting effect on the scope of any claim elements.

The systems and methods described herein may be embodied in other specific forms without departing from the characteristics thereof. The foregoing implementations are illustrative rather than limiting of the described systems and methods. Scope of the systems and methods described herein is thus indicated by the appended claims, rather than the foregoing description, and changes that come within the meaning and range of equivalency of the claims are embraced therein.

What is claimed:

1. A system to process packetized audio signals in a voice activated computer network, comprising:
    a digital assistant application executed by a processor of a client device to transmit data packets via a client device network interface over a network, the data packets including a first input audio signal, detected by a sensor of the client device, and first client device configuration data;
    a natural language processor component executed by a data processing system configured to receive, over the network, via a network interface of the data processing system, the data packets, the natural language processor component to parse the first input audio signal to identify a first request and a first trigger keyword corresponding to the first request; and
    a client device configuration appliance executed by the data processing system configured to:
        determine from the first client device configuration data that a display associated with the client device is in an OFF state,
        generate, based in part on the first trigger keyword and the OFF state of the display, a first response data structure, the first response data structure including audio data and not including video data responsive to the first request, and
        transmit, over the network, via the network interface of the data processing system, the first response data structure to the digital assistant application at the client device.

2. The system of claim 1, wherein the client device configuration appliance executed by the data processing system is further configured to:
    determine, from the first client device configuration data, a current volume level of at least one speaker at the client device,
    generate first client device configuration settings including a first volume level for the at least one speaker at the client device, the first volume level being greater of the current volume level and a minimum response audio level, and
    transmit, over the network, via the network interface of the data processing system, the first client device configuration settings to the digital assistant application at the client device.

3. The system of claim 1 further comprising:
    the digital assistant application executed by the processor of the client device to transmit data packets via the client device network interface over the network, the data packets including a second input audio signal, detected by a sensor of the client device, and second client device configuration data;

the natural language processor component executed by the data processing system configured to receive, over the network, via the network interface of the data processing system, the data packets, the natural language processor component to parse the second input audio signal to identify a second request and a second trigger keyword corresponding to the second request;

the client device configuration appliance executed by the data processing system is further configured to:
 determine from the second client device configuration data that the display associated with the client device is in an OFF state,
 generate second client device configuration settings including and ON state for the display associated with the client device,
 generate a second response data structure, the second response data structure including video data and responsive to the second request and the second client device configuration settings,
 transmit, over the network, via the network interface of the data processing system, the second response data structure to the digital assistant application at the client device.

4. The system of claim 3 wherein the digital assistant application executed by the processor of the client device is further configured to:
 receive, over the network, via the network interface of the client device, the second response data structure, the second response data structure including video data and the second client device configuration settings,
 cause the display associated with the client device to switch to an ON state, and
 cause the video data to be displayed on the display.

5. The system of claim 1 further comprising:
 the digital assistant application executed by the processor of the client device to transmit data packets via the client device network interface over the network, the data packets including a third input audio signal, detected by a sensor of the client device, and third client device configuration data;
 the natural language processor component executed by the data processing system configured to receive, over the network, via the network interface of the data processing system, the data packets, the natural language processor component to parse the third input audio signal to identify a third request and a third trigger keyword corresponding to the second request; and
 the client device configuration appliance executed by the data processing system is further configured to:
  determine form the third client device configuration data that the display associated with the client device is in an ON state,
  generate based in part on the third trigger keyword and the ON state of the display, a third response data structure, the third response data structure including audio data and video data responsive to the third request, and
  transmit, over the network, via the network interface of the data processing system, the third response data structure to the digital assistant application at the client device.

6. The system of claim 5 further comprising, wherein the client device configuration appliance executed by the data processing system is further configured to:

generate status video data, and
transmit, over the network, via the network interface of the data processing system, the status video data to the digital assistant application at the client device prior to the transmission of the third response data structure, the digital assistant application executed by the processor of the client device to display the status video on the display associated with the client device.

7. The system of claim 1 further, wherein the client device configuration appliance executed by the data processing system is further configured to:
 generate configuration settings indicating activation of light emitting status indicators on the client device, and
 transmit, over the network, via the network interface of the data processing system, the configuration settings to the digital assistant application at the client device prior to the transmission of the first response data structure.

8. The system of claim 7, wherein the digital assistant application executed by a processor of a client device is further configured to:
 receive, via the network interface of the client device, over the network, the configuration settings indicating activation of light emitting status indicators on the client device, and
 cause light emitting status indicators on the client device to activate.

9. The system of claim 1, wherein the client device includes a radio-frequency tuner.

10. The system of claim 1, wherein the digital assistant application executed by a processor of a client device is further configured to:
 receive, via the network interface of the client device, over the network, the first response data structure, the first response data structure including audio data and not including video data responsive to the first request,
 determine the audio data, and
 cause the audio data to be played on at least one speaker of the client device.

11. A method to process packetized audio signals in a voice activated computer network, comprising:
 transmitting data packets by a digital assistant application executed by a processor of a client device, via a client device network interface, over a network, the data packets including a first input audio signal, detected by a sensor of the client device, and a first client device configuration data;
 receiving, at a natural language processor component executed by a data processing system, over the network, via a network interface of the data processing system, the data packets, the natural language processor component to parse the first input audio signal to identify a first request and a first trigger keyword corresponding to the first request;
 determining, at a client device configuration appliance executed by the data processing system, from the first client device configuration data that a display associated with the client device is in an OFF state;
 generating, at the client device configuration appliance, based in part on the first trigger keyword and the OFF state of the display, a first response data structure, the first response data structure including audio data and not including video data responsive to the first request; and
 transmitting, over the network, via the network interface of the data processing system, the first response data structure to the digital assistant application at the client device.

12. The method of claim 11 further comprising:
determining, at the client device configuration appliance, from the first client device configuration data, a current volume level of at least one speaker at the client device;
generating, at the client device configuration appliance, first client device configuration settings including a first volume level for the at least one speaker at the client device, the first volume level being greater of the current volume level and a minimum response audio level; and
transmitting over the network, via the network interface of the data processing system, the first client device configuration settings to the digital assistant application at the client device.

13. The method of claim 11 further comprising:
transmitting data packets by the digital assistant application executed by the processor of the client device, via the client device network interface, over the network, the data packets including a second input audio signal, detected by the sensor of the client device, and a second client device configuration data;
receiving, at the natural language processor component executed by the data processing system, over the network, via the network interface of the data processing system, the data packets, the natural language processor component to parse the second input audio signal to identify a second request and a second trigger keyword corresponding to the second request;
determining, at the client device configuration appliance executed by the data processing system, from the second client device configuration data that the display associated with the client device is in an OFF state;
generating, at the client device configuration appliance, second client device configuration settings including an ON state for the display associated with the client device;
generating, at the client device configuration appliance, based in part on the second trigger keyword, a second response data structure, the second response data structure including video data and responsive to the second request and the second client device configuration settings;
transmitting, over the network, via the network interface of the data processing system, the second response data structure to the digital assistant application at the client device.

14. The method of claim 13 further comprising:
receiving, at the digital assistant application executed by the processor of the client device, over the network, via the network interface of the client device, the second response data structure, the second response data structure including video data and the second client device configuration settings;
causing, by the digital assistant application, the display associated with the client device to switch to an ON state; and
causing, by the digital assistant application, the video data to be displayed on the display associated with the client device.

15. The method of claim 11 further comprising:
transmitting data packets by the digital assistant application executed by the processor of the client device, via the client device network interface, over the network, the data packets including a third input audio signal, detected by the sensor of the client device, and a third client device configuration data;
receiving, at the natural language processor component executed by the data processing system, over the network, via the network interface of the data processing system, the data packets, the natural language processor component to parse the third input audio signal to identify a third request and a third trigger keyword corresponding to the third request;
determining, at the client device configuration appliance executed by the data processing system, from the third client device configuration data that the display associated with the client device is in an ON state;
generating, at the client device configuration appliance, based in part on the third trigger keyword and the ON state of the display, a third response data structure, the third response data structure including video data and responsive to the third request and the third client device configuration settings;
transmitting, over the network, via the network interface of the data processing system, the third response data structure to the digital assistant application at the client device.

16. The method of claim 15 further comprising:
generating, at the client device configuration appliance, status video data;
transmitting, over the network, via the network interface of the data processing system, the status video data to the digital assistant application at the client device prior to the transmission of the third response data structure; and
causing, by the digital assistant application executed by the processor of the client device, the status video data to be displayed on the display associated with the client device.

17. The method of claim 11 further comprising:
generating, at the client device configuration appliance, configuration settings indicating activation of light emitting status indicators on the client device; and
transmitting, over the network, via the network interface of the data processing system, the configuration settings to the digital assistant application at the client device prior to the transmission of the first response data structure.

18. The method of claim 17 further comprising:
receiving, at the digital assistant application at the client device, the configuration settings indicating activation of light emitting status indicators on the client device; and
causing, by the digital assistant application, the light emitting status indicators on the client device to activate.

19. The method of claim 11, wherein the client device includes a radio-frequency tuner.

20. The method of claim 11 further comprising:
receiving, at the digital assistant application executed by the processor of the client device, over the network, via the network interface of the client device, the first response data structure, the first response data structure including audio data and not including video data responsive to the first request;
determining, by the digital assistant application, the audio data; and
causing, by the digital assistant application, the audio data to be played on at least one speaker of the client device.

* * * * *